Patented Aug. 3, 1926.

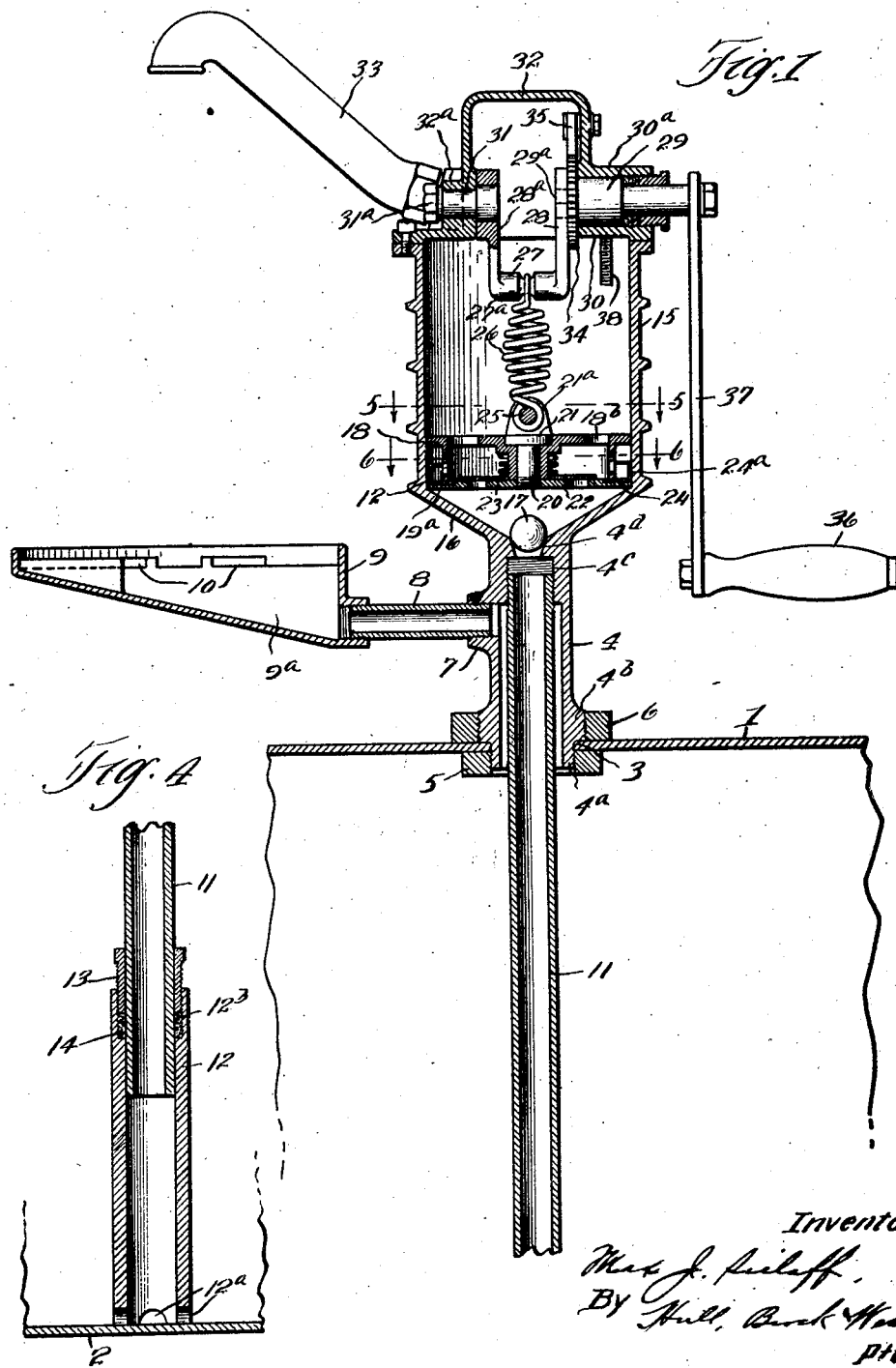

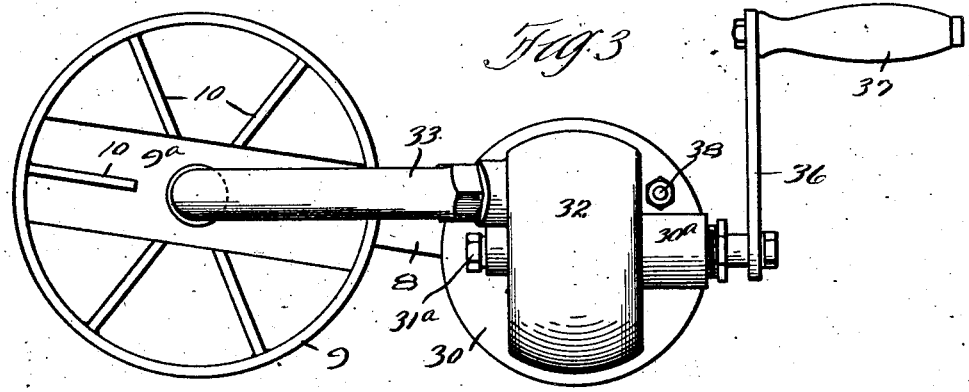
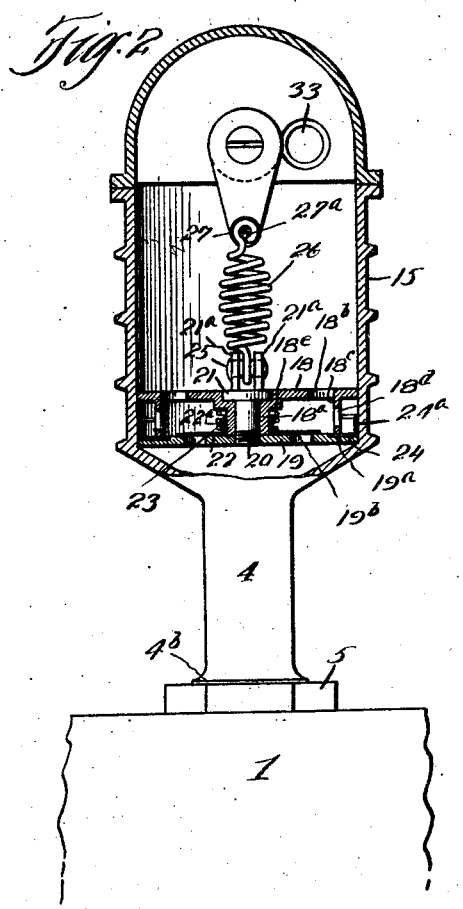
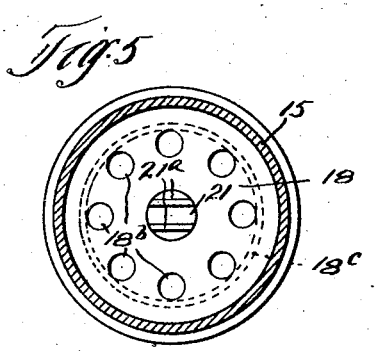
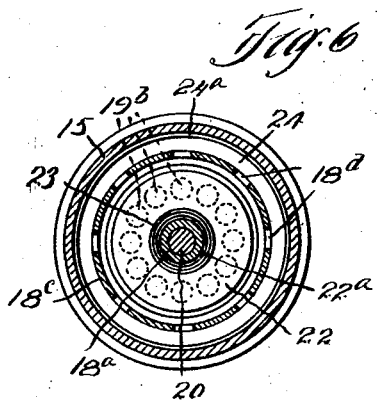

1,595,027

UNITED STATES PATENT OFFICE.

MAX J. SIELAFF, OF CLEVELAND, OHIO.

DISPENSING AND MEASURING DEVICE.

Application filed June 14, 1923. Serial No. 645,250.

This invention relates to liquid measuring and dispensing apparatus, and more particularly to apparatus of this character which is employed for the purpose of dispensing a measured quantity of liquid; and, in the form illustrated herein, is particularly well adapted for dispensing grease or oil.

Among the objects of the invention are: to provide a simple, efficient and economical apparatus for the purpose set forth; to provide such apparatus with convenient means whereby only a predetermined amount of the liquid may be discharged during each cycle of operation of the piston or plunger; to provide a novel cooperating arrangement of stop and piston mounting; and to improve the construction of pistons for apparatus of this character. Further and more limited objects of the invention will appear in the specification and will be set forth in the combinations of elements embodied in the claims.

In the drawings, illustrating one embodiment of my invention, Fig. 1 represents a central vertical sectional view through the operating tank and a dispensing cylinder and plunger constructed in accordance with my invention; Fig. 2 a similar view of the cylinder and plunger, taken at substantially right angles to Fig. 1, the other parts being shown in elevation; Fig. 3 a plan view of the apparatus shown in Fig. 1; the top of the tank being omitted; Fig. 4 a sectional detail showing the lower end of the supply pipe and the bottom of the tank; and Figs. 5 and 6 sectional details corresponding respectively to the lines 5—5 and 6—6 of Fig. 1.

Describing the various parts in detail, 1 denotes the top and 2 the bottom wall of a tank in which the grease or other material to be dispensed is contained. The top of this tank is provided with the usual bunghole 3 which is adapted to receive the lower end of a sleeve 4. The sleeve is provided with a threaded lower end $4^a$ and a threaded shoulder $4^b$. Where the tank has a bunghole of the diameter of the lower end $4^a$, the screw will be threaded into a nut or sleeve 6 welded or otherwise suitably secured to the under side of the top 1, the sleeve being locked in place by a nut 5 threaded onto the shoulder $4^b$. Where the tank has a bunghole of the diameter of the shoulder $4^b$, then this shoulder will be threaded into the nut or sleeve 6 and the nut 5 will be applied to the opposite or upper portion of the shoulder. The sleeve is provided with a threaded connection 7 which is adapted to receive a pipe 8, the outer end of which is threaded into the lower end of a central downwardly inclined trough $9^a$ carried by a platform 9. This platform is provided with ribs 10 adapted to support a cup or receptacle which is to receive the measured quantity of grease or other material delivered by the pump.

Above the connection 7, the bore of the sleeve is reduced and provided with a thread $4^c$, being provided above such threaded bore with an outwardly and upwardly flaring port $4^d$ discharging into the bottom of the cylinder. The upper section 11 of the supply pipe is threaded into the bore $4^c$. The lower end of this section is telescoped within the upper portion of the lower section 12, said lower section extending to the bottom 2 and being provided with openings $12^a$ for admitting the grease or other liquid into the section 12. The upper end of the section 12 is provided with a threaded recess indicated at $12^b$, said recess being adapted to receive the lower end of a packing sleeve 13, threaded thereinto, with packing (indicated at 14) inserted between the lower end of said sleeve and the bottom of the recess $12^b$. This construction of supply pipe enables the latter to be adjusted as to length for varying depths of tank while maintaining a leak-proof connection between the two telescopic sections, whereby the vacuum, or partial vacuum, produced within said pipe during the upward movement of the piston will be maintained.

15 denotes the body of the cylinder, the same being provided with an inverted frusto-conical bottom 16. The cylinder and its bottom are shown as a continuation of the sleeve 4, the port $4^d$ being at the center of the bottom of the cylinder, said port being provided with a ball check valve, indicated at 17.

The piston shown herein consists generally of an upper and a lower section, with a packing ring clamped between said sections and a flap check valve mounted upon the upper and lower sections and controlling the ports or openings in the lower section.

The upper section comprises a circular plate 18 having a hollow central stud $18^a$ which is adapted to engage the central portion of the lower piston section, indicated generally at 19. The plate 18 is provided with openings $18^b$ therethrough and with a cylindrical wall 18ᶜ depending from said plate, within the margin thereof and surrounding the outer edges of the said openings. The wall 18ᶜ is provided with ports 18ᵈ.

The lower section 19 consists of a circular plate of the same diameter as the plate 18 and hvaing a depressed annular seat 19ᵃ in its upper marginal face and a series of openings or ports 19ᵇ between such seat and the central portion thereof. The upper and lower sections are connected by means of a stud 20 having a head 21 resting in a recess in the top of the plate 18, with its lower end threaded into the central opening in the plate 19. Mounted on the sleeve or hollow stud 18ᵃ is the collar 22ᵃ of a flap valve 22, the said flap valve being preferably of leather and being retained in proper relation to the lower section 19 and the ports 19ᵇ therethrough by means of a helical spring 23 surrounding the collar 22ᵃ and bearing at its lower end against the horizontal portion of the flap valve and its upper end against the shoulder 18ᵉ. Reference has been made to the annular seat 19ᵃ for a packing ring. The packing ring shown herein is preferably of leather and comprises a horizontal portion 24 fitting in said seat and a vertical cylindrical portion 24ᵃ adapted to engage the inner wall of the cylinder 15. The packing ring is retained in place by means of the lower end of the wall 18ᶜ.

Projecting upwardly from the head 21 of the stud 20 are two lugs 21ᵃ, the said lugs supporting a pin 25 to which is connected the lower end of a coiled spring 26. The upper end of said spring is connected to the central portion 27ᵃ of a crank 27, one of the arms 28 of which is secured rigidly to the inner end 29ᵃ of a shaft 29 mounted in a housing 30ᵃ carried by and projecting upwardly from the cover 30 for the cylinder. The other arm 28ᵃ is mounted on the inner enlarged cylindrical end of a stud 31, the inner end of said stud being within a housing 32 carried by and projecting upwardly from the cover 30, the outer end of the stud projecting through the said housing and a boss 32ᵃ thereon and being drawn to its seat by means of a nut 31ᵃ. From the housing 32 extends the delivery spout 33.

The shaft 29 is provided, within the housing 32, with a ratchet wheel 34 which is adapted to be engaged by a detent pawl 35, to prevent backward rotation of the shaft 29 by the handle 36 and arm 37. Projecting through the top of the cylinder and into the interior of the cylinder is a stop screw 38, which is adapted to limit the upward movement of the piston or plunger. This stop screw may be secured and locked in its adjusted position in any desired manner, preferably by the means disclosed in my copending application No. 645,249, filed June 14, 1923.

With the parts constructed and arranged as described, the operation will be readily understood.

Grease (or other liquid) will be delivered by the upward movement of the piston (caused by the rotation of the shaft), through the delivery spout 32. Should the bottom of the stop screw 38 engage the piston before the crank 27 reaches its upper center, the spring 26 will yield and permit the crank to pass its upper center without injury to the parts. The spring will be of sufficient stiffness so that, after the crank shall have passed its upper center, it will cooperate with such crank to assist in moving the piston downwardly, the peripheral portion of the flap valve lifting as the piston descends to permit the free passage of the grease or other liquid through the ports or openings 19ᵇ and 18ᵇ. The tapering of the bottom 16 of the cylinder allows the valve 17 to be quickly seated at the end of the upward movement of the piston and to remain seated until the next upward excursion of the latter.

Any drip from the spout 23 or any liquid spilled from the receptacle upon the platform will drain through the trough 9ᵃ, pipe 8, and the annular chamber in the neck 4 into the tank.

Having thus described my invention, what I claim is:

1. A measuring and dispensing device comprising a cylinder having a delivery outlet and a supply connection, a piston movable between said outlet and connection, and means for operating said piston, said means comprising a shaft having an operating arm outside said cylinder, a crank mounted on said shaft within said cylinder, and a piston connected through a resilient element with said crank, said piston having one or more valve controlled ports therethrough.

2. A measuring and dispensing device comprising a cylinder having a delivery outlet and a supply connection, a piston movable between said outlet and connection, said piston having one or more ports arranged to permit the passage of liquid therethrough during its movement toward the said connection, a shaft for operating the said piston, and a flexible connection between the said shaft and the said piston.

3. A measuring and dispensing device comprising a cylinder having a delivery outlet and a supply connection, a piston within said cylinder movable between said outlet and said connection, said piston having one or more ports adapted to allow the passage of liquid therethrough during its movement toward the said connection, a shaft, a flexible connection between the said shaft and the said piston, and an adjustable stop for limiting the movement of the piston toward the outlet.

4. A measuring and dispensing device comprising a cylinder having a delivery outlet and a supply connection, a piston movable between said outlet and said connection, the said piston having one or more ports adapted to permit the passage of liquid therethrough during its movement toward the said connection, a shaft, a crank on said shaft, and a coiled spring connecting said crank with said piston.

5. A measuring and dispensing device comprising a cylinder having a supply connection and a delivery outlet, a piston movable between said connection and outlet and having one or more openings for the passage of liquid therethrough during its movement toward the said connection, a shaft having a crank within said cylinder, a coiled spring connecting the said piston and the said crank, a ratchet on said shaft, and a detent pawl cooperating with said ratchet.

In testimony whereof, I hereunto affix my signature.

MAX J. SIELAFF.